United States Patent
Yanakiev et al.

(10) Patent No.: US 9,097,191 B2
(45) Date of Patent: Aug. 4, 2015

(54) CHARGE FLOW TEMPERATURE ESTIMATION

(75) Inventors: Ognyan N. Yanakiev, Birmingham, MI (US); Charles E. Solbrig, Ypsilanti, MI (US); Ryle Maxson, Monterey, CA (US)

(73) Assignee: GM Global Technology Operations LLC, Detroit, MI (US)

(*) Notice: Subject to any disclaimer, the term of this patent is extended or adjusted under 35 U.S.C. 154(b) by 358 days.

(21) Appl. No.: 13/530,548

(22) Filed: Jun. 22, 2012

(65) Prior Publication Data

US 2013/0343421 A1 Dec. 26, 2013

(51) Int. Cl.
| | |
|---|---|
| *G01K 1/12* | (2006.01) |
| *G01M 15/00* | (2006.01) |
| *F02D 41/00* | (2006.01) |
| *F02D 41/18* | (2006.01) |
| *F02M 35/10* | (2006.01) |
| *F02B 29/04* | (2006.01) |
| *F02M 25/07* | (2006.01) |

(52) U.S. Cl.
CPC ........ *F02D 41/0072* (2013.01); *F02B 29/0406* (2013.01); *F02B 29/0493* (2013.01); *F02D 41/18* (2013.01); *F02M 25/0728* (2013.01); *F02M 25/0754* (2013.01); *F02M 35/1038* (2013.01); *F02D 2041/0067* (2013.01); *F02D 2200/0414* (2013.01); *F02D 2200/0416* (2013.01); *F02M 25/0707* (2013.01); *Y02T 10/146* (2013.01); *Y02T 10/47* (2013.01)

(58) Field of Classification Search
CPC ........................................................ G01K 1/14
USPC ............................................... 374/1, E15.001
See application file for complete search history.

(56) References Cited

U.S. PATENT DOCUMENTS

| | | | | |
|---|---|---|---|---|
| 5,746,049 | A | * | 5/1998 | Cullen et al. ................ 60/274 |
| 6,026,784 | A | * | 2/2000 | Weisman et al. ............ 123/436 |
| 6,629,453 | B1 | * | 10/2003 | Surnilla et al. ............. 73/114.73 |
| 2005/0096833 | A1 | * | 5/2005 | Nakazawa .................... 701/102 |
| 2005/0102076 | A1 | * | 5/2005 | Kariya et al. ................. 701/34 |
| 2010/0180576 | A1 | * | 7/2010 | Wang et al. .................... 60/276 |

* cited by examiner

*Primary Examiner* — Lisa Caputo
*Assistant Examiner* — Nasir U Ahmed
(74) *Attorney, Agent, or Firm* — Cantor Colburn LLP

(57) ABSTRACT

An engine air system for charge flow temperature estimation includes a charge air cooler outlet temperature sensor configured to provide a first temperature signal, an exhaust gas recirculation outlet temperature sensor configured to provide a second temperature signal, and a control module configured to receive the first temperature signal and the second temperature signal. The control module includes a charge flow temperature estimation module configured to determine an the estimated charge flow temperature at an intake manifold temperature sensing position based on a combination of the first temperature signal multiplied by an estimated fresh air fraction and the second temperature signal multiplied by an exhaust gas recirculation fraction.

20 Claims, 4 Drawing Sheets

CHARGE FLOW TEMPERATURE ESTIMATION

FIELD OF THE INVENTION

Exemplary embodiments of the invention relate to charge flow temperature estimation for internal combustion engines and, more particularly, to charge flow temperature estimation utilizing temperature sensors at different locations.

BACKGROUND

During combustion in an internal combustion engine, an air/fuel mixture is delivered through an intake valve to cylinders and is compressed and combusted therein. After combustion, the pistons force the exhaust gas in the cylinders into an exhaust system. To efficiently control an internal combustion engine, a number of sensors typically provide feedback for controlling engine system actuators. An engine control module receives inputs, such as an engine speed, flow rates, pressures and temperatures, from a number of sensors and controls the amount of fuel provided to the engine as well as air intake and exhaust system actuators in response to the inputs. Accurate inputs improve the ability of the engine control module to reduce emissions and improve fuel economy of the engine.

Complexity of engine control systems typically increases as engine system designers seek to improve durability, power, fuel economy, and reduce combustion noise while complying with government-mandated emissions standards. As additional sensors are included in an engine system, the system cost and weight increase. Accordingly, it is desirable to eliminate and synthesize one or more sensors based on available inputs and system parameters such that control algorithms can operate using synthesized sensor input while eliminating the system cost, weight, and servicing requirements associated with one or more physical sensors.

SUMMARY OF THE INVENTION

In one exemplary embodiment of the invention, an engine air system for charge flow temperature estimation includes a charge air cooler outlet temperature sensor configured to provide a first temperature signal, an exhaust gas recirculation outlet temperature sensor configured to provide a second temperature signal, and a control module configured to receive the first temperature signal and the second temperature signal. The control module includes a charge flow temperature estimation module configured to determine an the estimated charge flow temperature at an intake manifold temperature sensing position based on a combination of the first temperature signal multiplied by an estimated fresh air fraction and the second temperature signal multiplied by an exhaust gas recirculation fraction.

In another embodiment, a method for determining an estimated charge flow temperature in an engine air system is provided. The method includes receiving a first temperature signal from a charge air cooler outlet temperature sensor. The method also includes receiving a second temperature signal from an exhaust gas recirculation outlet temperature sensor. The method further includes determining the estimated charge flow temperature at an intake manifold temperature sensing position based on a combination of the first temperature signal multiplied by an estimated fresh air fraction and the second temperature signal multiplied by an exhaust gas recirculation fraction. The estimated charge flow temperature is provided for use by a control module of the engine air system.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
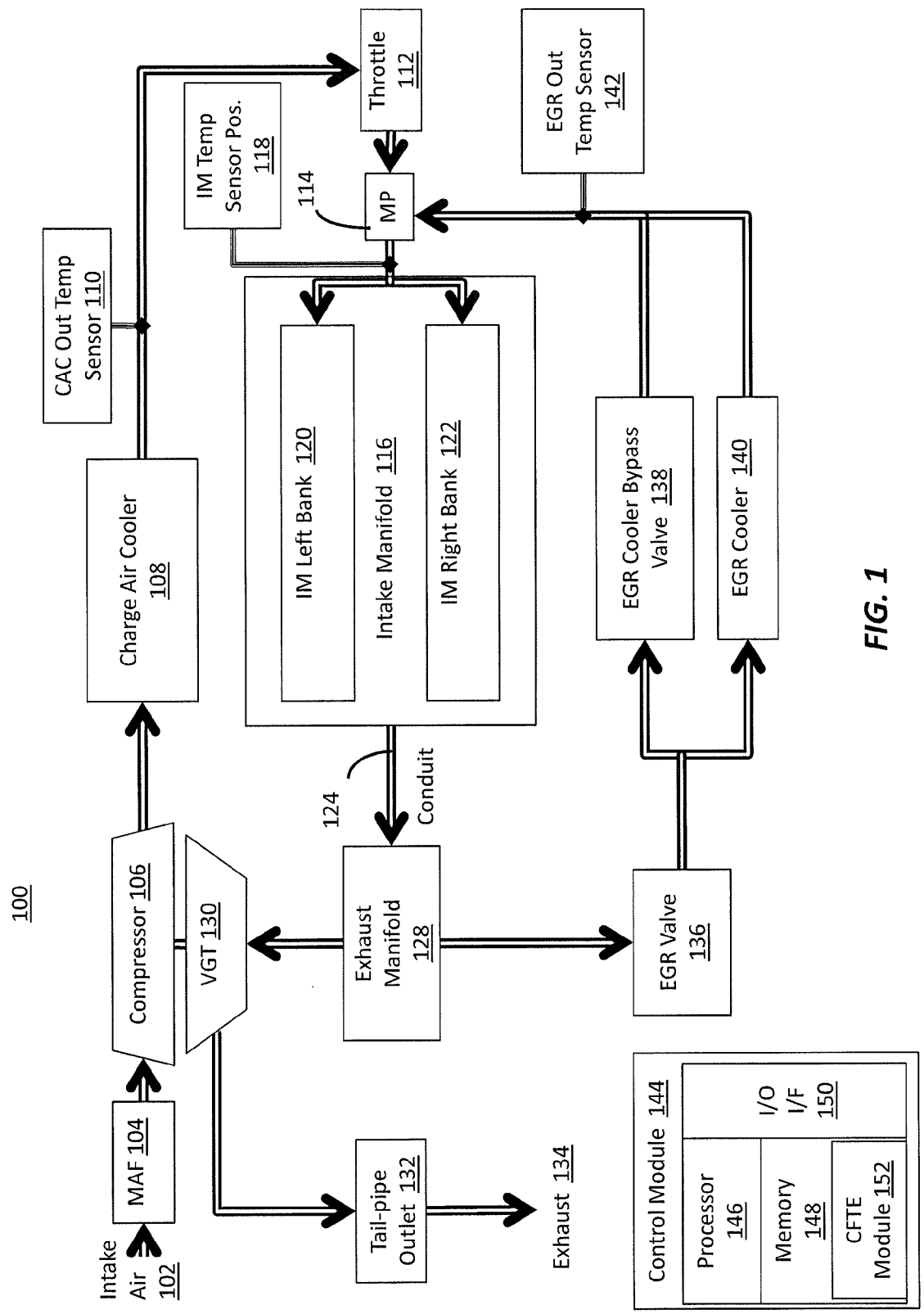
FIG. 1 is a schematic diagram of an exemplary engine air system.

Referring now to FIG. 1, an exemplary embodiment is directed to an engine air system 100. The engine air system 100 is configured to receive an intake air 102 through an intake mass air flow sensor 104 for determining the intake air mass of the engine air system 100. In one embodiment, the intake mass air flow sensor 104 may be either a vane meter or a hot wire type intake mass air flow sensor; however, it is to be understood that other types of sensors may be used as well. The intake air 102 is compressed and heated by a compressor 106 and then cooled by a charge air cooler 108. Air temperature at an outlet of the charge air cooler 108 can be determined by a charge air cooler outlet temperature sensor 110 configured between the charge air cooler 108 and a throttle 112. The throttle 112 controls air flow to a mixing point 114. An intake manifold 116 is configured to receive a charge flow from the mixing point 114. An intake manifold temperature sensing position 118, where a charge flow temperature is to be determined, is located between the intake manifold 116 and the mixing point 114.

In the example depicted in FIG. 1, the intake manifold 116 includes an intake manifold left bank 120 and an intake manifold right bank 122; however, it will be understood that the intake manifold left bank 120 and/or the intake manifold right bank 122 can be omitted in other embodiments, such as a straight engine as opposed to a V engine. After combustion, exhaust gas flows from conduit 124 to exhaust manifold 128. Exhaust gas flows from the exhaust manifold 128 to a variable geometry turbocharger 130 and out of a tail-pipe outlet 132 as exhaust 134. Exhaust gas also flows from the exhaust manifold 128 through an exhaust gas recirculation (EGR) valve 136. The EGR valve 136 controls an exhaust gas flow that is further divided through an EGR cooler bypass valve 138 and an EGR cooler 140. Recirculated exhaust gas returns to mixing point 114. An EGR outlet temperature sensor 142 is configured between the EGR cooler 140 and the mixing point 114.

A control module 144 includes a processor 146, memory 148, and an input/output (I/O) interface 150. The processor 146 is configured to receive sensor inputs and drive outputs through the I/O interface 150. For example, the processor 146 can receive temperature signals from the charge air cooler outlet temperature sensor 110 and the EGR outlet temperature sensor 142, and can control the throttle 112 and EGR valve 136 in addition to processing other I/O of the engine air system 100. Memory 148 may hold executable instructions, control laws, and data for use by the processor 146.

In an embodiment, the control module 144 includes a charge flow temperature estimation module 152, which is depicted in memory 148 of FIG. 1 and executed by the processor 146 such that the charge flow temperature estimation module 152 is tangibly embodied within the control module 144. The charge flow temperature estimation module 152 estimates a charge flow temperature at the intake manifold temperature sensing position 118 based on temperature signals received from the charge air cooler outlet temperature sensor 110 and the EGR outlet temperature sensor 142. The estimated charge flow temperature eliminates a physical sensor that would otherwise be present at the intake manifold temperature sensing position 118.

Figure 2:
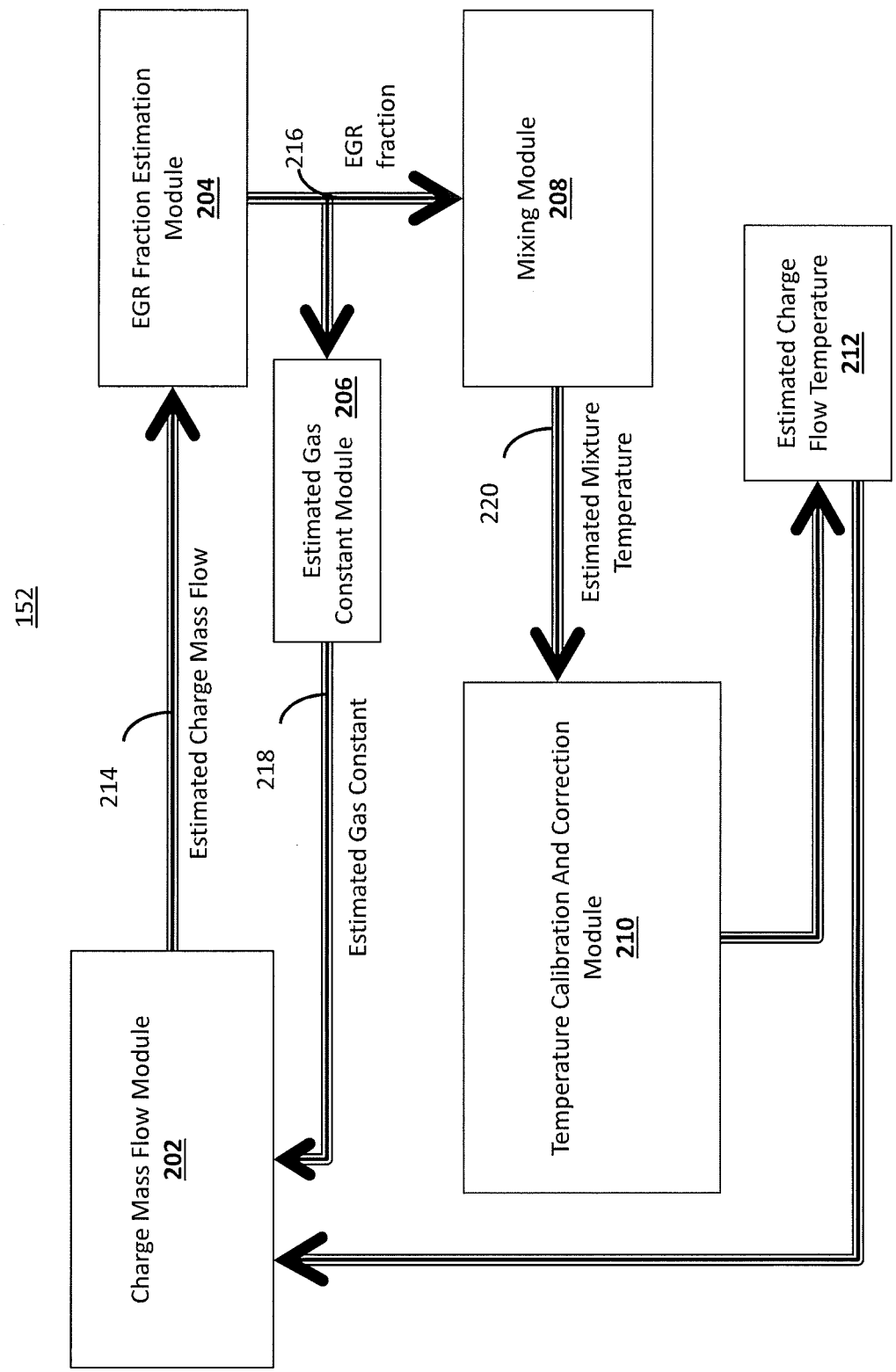
FIG. 2 is a dataflow diagram of a charge flow temperature estimation module of a control module of FIG. 1.

FIG. 2 is an illustration of a dataflow diagram that illustrates various elements that may be embedded within the control module 144 of FIG. 1 to implement the charge flow temperature estimation module 152. Various embodiments of the engine air system 100 of FIG. 1 may include any number of sub-modules embedded within the charge flow temperature estimation module 152. As can be appreciated, the sub-modules shown in FIG. 2 may be combined or further partitioned as well. Inputs to the charge flow temperature estimation module 152 may be sensed from the engine air system 100 of FIG. 1, received from other control modules (not shown), or determined by other sub-modules or modules.

An embodiment of the charge flow temperature estimation module 152 depicted in FIG. 2 includes a charge mass flow module 202 in communication with an EGR fraction estimation module 204. The EGR fraction estimation module 204 may provide output to an estimated gas constant module 206 and a mixing module 208. The estimated gas constant module 206 can provide feedback to the charge mass flow module 202. Alternatively, the estimated gas constant module 206 can be omitted. The mixing module 208 communicates with a temperature calibration and correction module 210, which outputs an estimated charge flow temperature 212. The estimated charge flow temperature 212 is returned to the charge mass flow module 202.

The charge mass flow module 202 can determine an estimated charge mass flow 214 based on an engine speed, volumetric efficiency, a previous value of the estimated charge flow temperature 212, and an intake manifold pressure from the intake manifold 116 of FIG. 1. The EGR fraction estimation module 204 can determine an EGR fraction 216 based on the estimated charge mass flow 214 from the charge mass flow module 202, a mass air flow from intake mass air flow sensor 104 of FIG. 1, and an EGR valve position of the EGR valve 136 of FIG. 1. The estimated gas constant module 206 can provide an estimated gas constant 218 to the charge mass flow module 202 based on the EGR fraction 216 from the EGR fraction estimation module 204. The mixing module 208 can determine an estimated mixture temperature 220 based on the temperature signals received from the charge air cooler outlet temperature sensor 110 and the EGR outlet temperature sensor 142 of FIG. 1 and the EGR fraction 216 from the EGR fraction estimation module 204. The temperature calibration and correction module 210 can determine the estimated charge flow temperature 212 based on the mass air flow from intake mass air flow sensor 104 of FIG. 1, the estimated mixture temperature 220 from the mixing module 208, the estimated charge mass flow 214 from the charge mass flow module 202, an engine coolant temperature, a vehicle speed, a fan speed, the engine speed, fuel flow, and the EGR fraction 216 from the EGR fraction estimation module 204.

Figure 3:
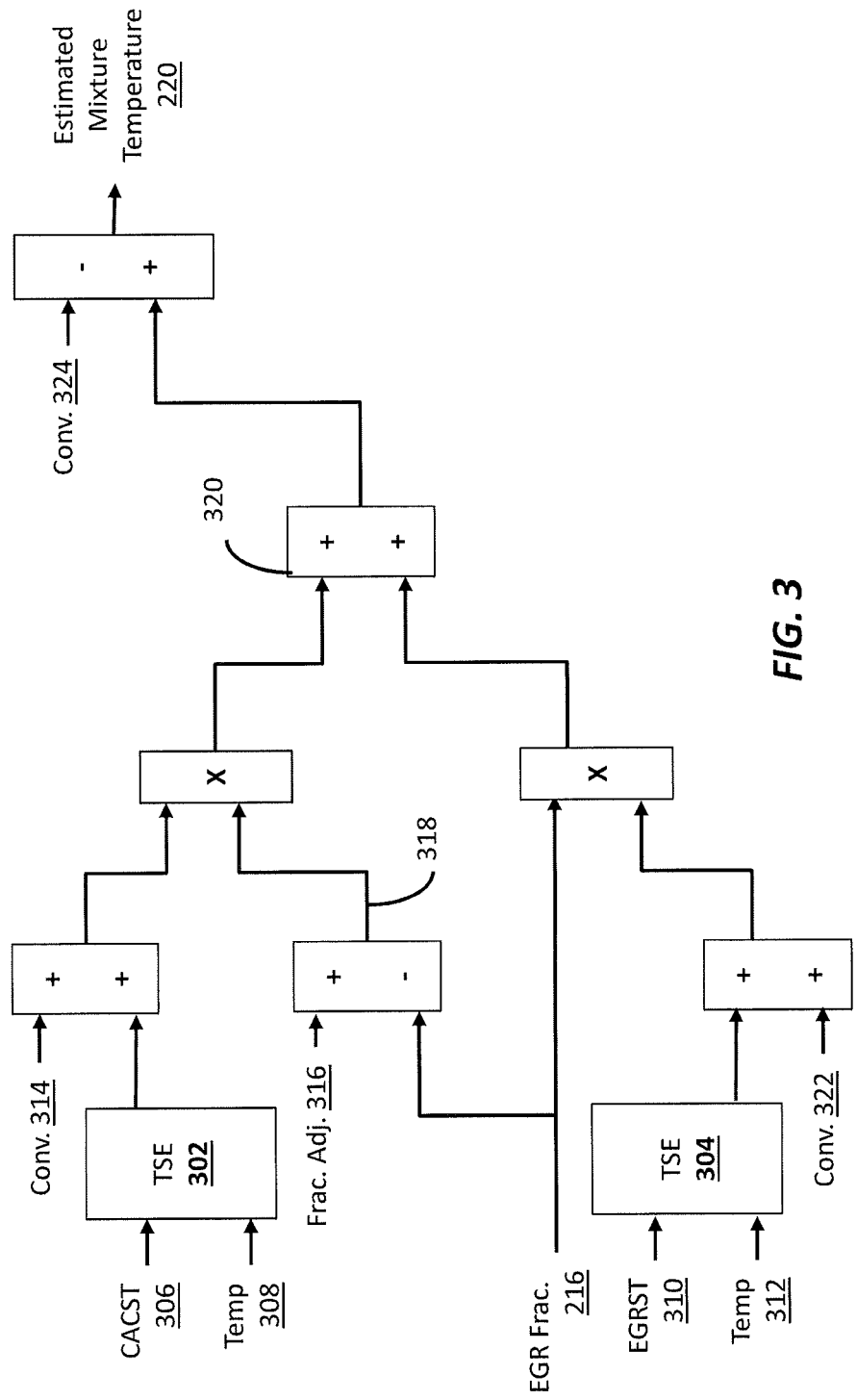
FIG. 3 is an exemplary process for determining an estimated mixture temperature by a mixing module in FIG. 2.
Figure 4:
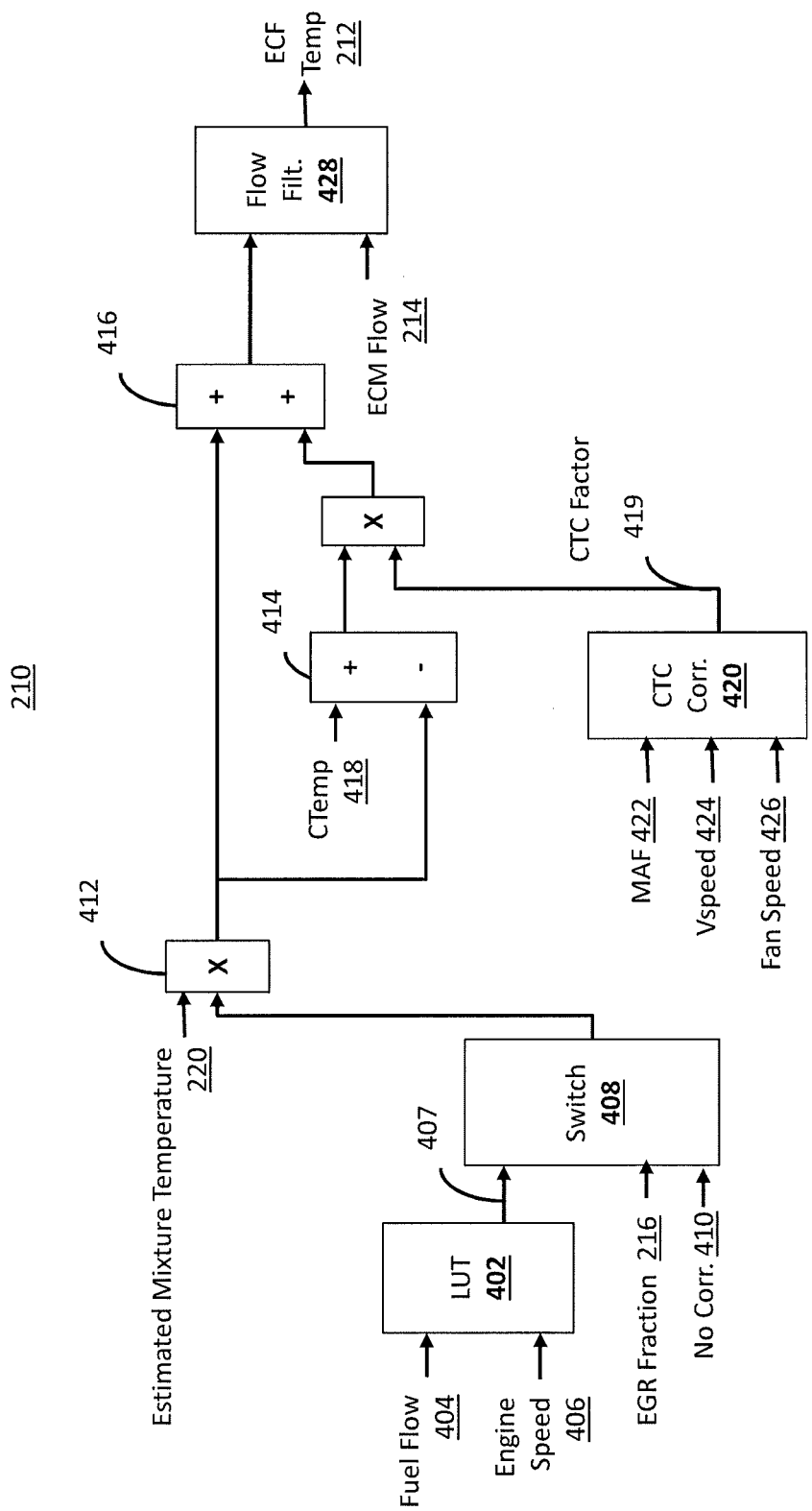
FIG. 4 is an exemplary process for determining an estimated charge flow temperature by a temperature calibration and correction module of FIG. 2.

The estimated charge mass flow 214 can be calculated by the charge mass flow module 202 using a speed density equation. For example, the estimated charge mass flow 214 may be calculated as a product of the engine speed, volumetric efficiency, and intake manifold pressure and further divided by a previous value of the estimated charge flow temperature 212 with appropriate unit conversions. The EGR fraction estimation module 204 can determine the EGR fraction 216 based on a multi-dimensional lookup table as a function of the estimated charge mass flow 214 from the charge mass flow module 202, the mass air flow from intake mass air flow sensor 104 of FIG. 1, and the EGR valve position of the EGR valve 136 of FIG. 1. The estimated gas constant module 206 can determine the estimated gas constant 218 based on a single-dimension lookup table. The mixing module 208 can determine the estimated mixture temperature 220 according to a process as depicted in FIG. 3. The temperature calibration and correction module 210 can determine the estimated charge flow temperature 212 according to a process as depicted in FIG. 4.

Turning to FIG. 3, one exemplary embodiment of a process to implement the mixing module 208 of FIG. 2 is illustrated. In the depicted embodiment, the mixing module 208 determines the estimated mixture temperature 220 as a baseline charge flow temperature estimate according to an energy balance equation:

$$T_{MIX} = T_{CACO} \times f_{AIR} + T_{EGRO} \times f_{EGR},$$

where:

$T_{MIX}$ is the estimated mixture temperature 220 of FIG. 2;
$T_{CACO}$ is a temperature signal from the charge air cooler outlet temperature sensor 110 of FIG. 1;
$f_{AIR}$ is an estimated fresh air fraction reaching mixing point 114 of FIG. 1, which may be estimated as a value complementary to $f_{EGR}$ such that $f_{AIR} = 1 - f_{EGR}$;
$T_{EGRO}$ is a temperature signal from the EGR outlet temperature sensor 142 of FIG. 1; and
$f_{EGR}$ is the EGR fraction 216 of FIG. 2.

In FIG. 3, temperature sensor enhancement blocks 302 and 304 can be included to account for time delays between temperature readings at the locations of the charge air cooler outlet temperature sensor 110 and the EGR outlet temperature sensor 142 of FIG. 1 and flow reaching the intake manifold temperature sensing position 118 of FIG. 1. In an embodiment, the temperature sensor enhancement blocks 302 and 304 are implemented using lead/lag transfer functions that may be adjusted based on one or more calibrated sensor time constants. Alternatively, the temperature sensor enhancement blocks 302 and 304 can be omitted if reduced accuracy in the estimated charge flow temperature 212 can be tolerated. In the example of FIG. 3, the temperature sensor enhancement block 302 receives a charge air cooler sensor time constant 306 and a first temperature signal 308 from the charge air cooler outlet temperature sensor 110 of FIG. 1. The temperature sensor enhancement block 304 receives an EGR sensor time constant 310 and a second temperature signal 312 from the EGR outlet temperature sensor 142 of FIG. 1. It will be understood that the first and second temperature signals 308 and 312 may be received at the I/O interface 150 of FIG. 1 and preprocessed by the control module 144 of FIG. 1 into appropriate engineering units, such as degrees C.

The output of temperature sensor enhancement blocks 302 and 304 may be in degrees C. and unit conversions may be needed to degrees K to consistently perform further processing. In the example of FIG. 3, the output of temperature sensor enhancement block 302 is summed with a conversion constant 314, multiplied by an estimated fresh air fraction 318 and output to a summing block 320. The estimated fresh air fraction 318 can be calculated as the difference between a fraction adjustment constant 316 and EGR fraction 216 of FIG. 2. In an embodiment, the fraction adjustment constant 316 is one. The output of temperature sensor enhancement block 304 is summed with a conversion constant 322, multiplied by EGR fraction 216 of FIG. 2, and output to the summing block 320. If a further unit conversion is needed to degrees C., the estimated mixture temperature 220 can be calculated as a difference between the output of summing block 320 and a conversion constant 324. In an embodiment, the conversion constants 314, 322, and 324 all have values of two hundred seventy-three. Alternatively, the conversion constant 324 can be negative two hundred seventy-three such that the final operation of the mixing module 208 is a sum instead of a difference.

Turning now to FIG. 4, an exemplary embodiment of a process to implement the temperature calibration and correction module 210 of FIG. 2 is illustrated. In the depicted embodiment, the temperature calibration and correction module 210 determines the estimated charge flow temperature 212 based on a number of corrections to adjust for fuel, speed, and coolant conditions. One or more of the corrections can be omitted if reduced accuracy in the estimated charge flow temperature 212 can be tolerated, including omitting the temperature calibration and correction module 210 where the estimated charge flow temperature 212 is set to the estimated mixture temperature 220 of FIG. 2.

In FIG. 4, block 402 is a two-dimensional lookup table based on fuel flow 404 and engine speed 406 to determine a fuel/speed correction factor 407. Parameters such as fuel flow 404 and engine speed 406 can be determined or received by the control module 144 of FIG. 1 based on speed and flow sensors (not depicted). A switch 408 can be included to determine whether to output the fuel/speed correction factor 407 or a no correction constant 410 based on the EGR fraction 216 of FIG. 2. The no correction constant 410 (e.g., a value of one) may be selected as the output of switch 408 when the EGR fraction 216 of FIG. 2 is at or below a threshold value indicating that substantially no EGR is circulating in the engine air system 100 of FIG. 1. Conversely, the fuel/speed correction factor 407 is selected as the output of switch 408 when the EGR fraction 216 of FIG. 2 is above a threshold value indicating that exhaust gas is recirculating in the engine air system 100 of FIG. 1.

In FIG. 4, a multiplier block 412 multiplies the output of switch 408 with the estimated mixture temperature 220 of FIG. 2, passing the output to a difference block 414 and a summing block 416. The difference block 414 determines a difference between a coolant temperature 418 and the output of multiplier block 412. The coolant temperature 418 can be determined or received by the control module 144 of FIG. 1 based on a coolant temperature sensor (not depicted). The output of difference block 414 is scaled by multiplying the output of difference block 414 times a coolant temperature correction factor 419 and passed to summing block 416 to be added with the output of multiplier block 412.

A coolant temperature coefficient correction block 420 calculates the coolant temperature correction factor 419 based on mass air flow 422 from intake mass air flow sensor 104 of FIG. 1, vehicle speed 424 and fan speed 426. The mass air flow 422 may be further corrected to account for sensor signal delay as a variable delay based on factors such as a volume of intake manifold piping, volumetric efficiency, and engine speed 406 according to a known speed density equation calculated by volume. The mass air flow correction can also be applied to other modules that use mass air flow, such as the EGR fraction estimation module 204. The vehicle speed 424 and fan speed 426 can be determined or received by the control module 144 of FIG. 1 based on various speed sensors (not depicted). The coolant temperature coefficient correction block 420 may use a multi-dimensional lookup table to determine the correction factor 419.

The output of summing block 416 can be further smoothed by a flow based filter 428 which calculates the estimated charge flow temperature 212 as a function of the estimated charge mass flow 214 of FIG. 2. The flow based filter 428 may be implemented as a lag filter to smooth transitions in the estimated charge flow temperature 212. The resulting estimated charge flow temperature 212 represents an estimate of temperature at the intake manifold temperature sensing position 118, which enables a physical temperature sensor to be removed from the intake manifold temperature sensing position 118. The estimated charge flow temperature 212 is provided for use to other modules or control logic of the control module 144 of FIG. 1. Additional values determined by the charge flow temperature estimation module 152 can also be made available to other modules or control logic within the control module 144 of FIG. 1.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An engine air system for charge flow temperature estimation, comprising:
    a charge air cooler outlet temperature sensor located between a charge air cooler and a throttle of the engine air system, the charge air cooler outlet temperature sensor configured to provide a first temperature signal, wherein the charge air cooler cools compressed intake air, and the throttle controls air flow to a mixing point;
    an exhaust gas recirculation outlet temperature sensor located between an exhaust gas recirculation cooler and the mixing point, the exhaust gas recirculation outlet temperature sensor configured to provide a second temperature signal; and
    a control module comprising an input/output interface that receives the first temperature signal and the second temperature signal, the control module comprising a charge flow temperature estimation module that comprises executable instructions stored in memory and executable by a processor of the control module to determine an the estimated charge flow temperature at an intake manifold temperature sensing position based on a combination of the first temperature signal multiplied by an estimated fresh air fraction and the second temperature signal multiplied by an exhaust gas recirculation fraction, wherein the intake manifold temperature sensing position is located between an intake manifold and the mixing point, the intake manifold configured to receive a charge flow from the mixing point.

2. The engine air system as recited in claim 1, wherein the estimated fresh air fraction and the exhaust gas recirculation fraction are complementary values, such that the estimated fresh air fraction plus the exhaust gas recirculation fraction equals one.

3. The engine air system as recited in claim 1, wherein the charge flow temperature estimation module further comprises a temperature calibration and correction module configured to correct the estimated charge flow temperature based on a coolant temperature.

4. The engine air system as recited in claim 3, wherein the estimated charge flow temperature is corrected as a sum of the estimated charge flow temperature and a scaled difference between the coolant temperature and the estimated charge flow temperature, wherein the scaled difference is a difference between the coolant temperature and the estimated charge flow temperature multiplied by a coolant temperature correction factor based on one or more of: a mass air flow, a vehicle speed, and a fan speed.

5. The engine air system as recited in claim 4, wherein the mass air flow is a corrected mass air flow based on a volume of intake manifold piping, a volumetric efficiency, and an engine speed.

6. The engine air system as recited in claim 4, further comprising:
a flow based filter configured to filter the estimated charge flow temperature as a function of the estimated charge mass flow to smooth the estimated charge flow temperature.

7. The engine air system as recited in claim 1, wherein the charge flow temperature estimation module further comprises a temperature calibration and correction module configured to correct the estimated charge flow temperature based on a fuel/speed correction factor.

8. The engine air system as recited in claim 7, wherein the estimated charge flow temperature is corrected based on the fuel/speed correction factor in response to the exhaust gas recirculation fraction being above a threshold value that indicates exhaust gas is recirculating in the engine air system.

9. The engine air system as recited in claim 1, wherein the first temperature signal is corrected to account for a time delay between a temperature reading at a location of the charge air cooler outlet temperature sensor and the intake manifold temperature sensing position, and the second temperature signal is corrected to account for a time delay between a temperature reading at a location of the exhaust gas recirculation outlet temperature sensor and the intake manifold temperature sensing position.

10. The engine air system as recited in claim 1, wherein the charge flow temperature estimation module further comprises:
a charge mass flow module configured to provide an estimated charge mass flow to an exhaust gas recirculation fraction estimation module;
the exhaust gas recirculation fraction estimation module configured to provide an exhaust gas recirculation fraction to a mixing module based on the estimated charge mass flow;
the mixing module configured to provide an estimated mixture temperature to a temperature calibration and correction module based on the exhaust gas recirculation fraction; and
the temperature calibration and correction module configured to output the estimated charge flow temperature based on the estimated mixture temperature.

11. The engine air system as recited in claim 10, wherein the charge flow temperature estimation module further comprises an estimated gas constant module to provide an estimated gas constant to the charge mass flow module based on the exhaust gas recirculation fraction.

12. A method for determining an estimated charge flow temperature in an engine air system, comprising:
receiving, at an input/output interface of a control module, a first temperature signal from a charge air cooler outlet temperature sensor located between a charge air cooler and a throttle of the engine air system, wherein the charge air cooler cools compressed intake air, and the throttle controls air flow to a mixing point;
receiving, at the input/output interface of the control module, a second temperature signal from an exhaust gas recirculation outlet temperature sensor located between an exhaust gas recirculation cooler and the mixing point;
determining, by a charge flow temperature estimation module that comprises executable instructions stored in memory and executable by a processor of the control module, the estimated charge flow temperature at an intake manifold temperature sensing position based on a combination of the first temperature signal multiplied by an estimated fresh air fraction and the second temperature signal multiplied by an exhaust gas recirculation fraction, wherein the intake manifold temperature sensing position is located between an intake manifold and the mixing point, the intake manifold configured to receive a charge flow from the mixing point; and
providing the estimated charge flow temperature for use by the control module of the engine air system.

13. The method as recited in claim 12, further comprising:
receiving an estimated charge mass flow from a charge mass flow module;
receiving a mass air flow from intake mass air flow sensor;
receiving an exhaust gas recirculation valve position from an exhaust gas recirculation valve; and
determining the exhaust gas recirculation fraction based on the estimated charge mass flow, the mass air flow, and the exhaust gas recirculation valve position.

14. The method as recited in claim 13, wherein the estimated fresh air fraction and the exhaust gas recirculation fraction are complementary values, such that the estimated fresh air fraction plus the exhaust gas recirculation fraction equals one.

15. The method as recited in claim 13, further comprising:
receiving an engine speed, a volumetric efficiency, and an intake manifold pressure of the engine air system; and
determining the estimated charge mass flow based on the engine speed, the volumetric efficiency, the intake manifold pressure, and a previous value of the estimated charge flow temperature.

16. The method as recited in claim 15, further comprising:
filtering the estimated charge flow temperature using a flow based filter as a function of the estimated charge mass flow to smooth the estimated charge flow temperature.

17. The method as recited in claim 12, further comprising:
correcting the estimated charge flow temperature as a sum of the estimated charge flow temperature and a scaled difference between a coolant temperature and the estimated charge flow temperature, wherein the scaled difference is a difference between the coolant temperature and the estimated charge flow temperature multiplied by a coolant temperature correction factor based on one or more of: a mass air flow, a vehicle speed, and a fan speed.

18. The method as recited in claim 17, wherein the mass air flow is a corrected mass air flow based on a volume of intake manifold piping, a volumetric efficiency, and an engine speed.

19. The method as recited in claim 12, further comprising:
correcting the estimated charge flow temperature based on a fuel/speed correction factor in response to the exhaust gas recirculation fraction being above a threshold value that indicates exhaust gas is recirculating in the engine air system.

20. The method as recited in claim 12, further comprising:
correcting the first temperature signal to account for a time delay between a temperature reading at a location of the charge air cooler outlet temperature sensor and the intake manifold temperature sensing position; and correcting the second temperature signal to account for a time delay between a temperature reading at a location of the exhaust gas recirculation outlet temperature sensor and the intake manifold temperature sensing position.

\* \* \* \* \*